P. H. THOMAS.
SYSTEM OF ELECTRICAL DISTRIBUTION.
APPLICATION FILED MAR. 29, 1913.

1,224,689.

Patented May 1, 1917.
4 SHEETS—SHEET 1.

P. H. THOMAS.
SYSTEM OF ELECTRICAL DISTRIBUTION.
APPLICATION FILED MAR. 29, 1913.

1,224,689.

Patented May 1, 1917.
4 SHEETS—SHEET 2.

P. H. THOMAS.
SYSTEM OF ELECTRICAL DISTRIBUTION.
APPLICATION FILED MAR. 29, 1913.

1,224,689.

Patented May 1, 1917.
4 SHEETS—SHEET 3.

Fig. 4

UNITED STATES PATENT OFFICE.

PERCY H. THOMAS, OF UPPER MONTCLAIR, NEW JERSEY, ASSIGNOR TO COOPER HEWITT ELECTRIC CO., OF HOBOKEN, NEW JERSEY, A CORPORATION OF NEW JERSEY.

SYSTEM OF ELECTRICAL DISTRIBUTION.

1,224,689.  Specification of Letters Patent.  Patented May 1, 1917.

Application filed March 29, 1913. Serial No. 757,499.

*To all whom it may concern:*

Be it known that I, PERCY H. THOMAS, a citizen of the United States, and resident of Upper Montclair, county of Essex, State of New Jersey, have invented certain new and useful Improvements in Systems of Electrical Distribution, of which the following is a specification.

My invention relates to the electrical transmission and utilization of power and more particularly to the use of high voltage direct current for this purpose. Systems are already in use in which high voltage direct currents are generated, transmitted and utilized, but these systems are limited in application by the fact that a number of direct current synchronous machines must be used in series where voltages are high and are further limited by the fact that the frames and shaft couplings of these series machines must be insulated. I have devised a scheme by which power can be transmitted over very high voltage lines in the form of direct current and conveniently utilized without the use of such series coupled synchronous machines. Briefly I make use of an alternating generating system producing high alternating voltages suitable for transmission purposes and rectify these alternating voltages through mercury vapor rectifiers for supplying the actual transmission line. At the receiving point or points for the purpose of receiving and distributing the energy transmitted I also provide an alternating potential machine capable of producing, with the aid of transformers, if necessary, high alternating voltages commensurate with the voltages of the line. Through the use of additional mercury vapor rectifiers and certain switch cylinders which I have devised I apply the direct current from the line upon the alternating electromotive force at the receiving point in a manner to be hereinafter explained and thus furnish power thereto. To enable an alternating generator to receive power from my direct current transmission line I rely fundamentally on the fact now well known that a superior electromotive force when producing a flow of current against a counter directed electromotive force supplies power to the circuit of the inferior electromotive force.

In carrying out this invention it is necessary to apply the direct current from the line upon the alternating current circuits at the receiving end at such times and in such directions that the actual flow of current is always in the direction of the line voltage and against the receiving alternating electromotive force; that is, in any one circuit connecting the two electromotive forces current can be permitted to flow only during one half of a cycle and further only during that half in which the direct current voltage is opposed to that of the alternating current. I utilize vapor electric rectifiers connected between the direct current line and the alternating receiving circuits to accomplish the suppression of the current flow during the periods of wrongly directed electromotive force. But it is further desirable in the economical use of my system to suppress the flow of current in the periods when the electromotive force is properly directed, should the current become reversed through the rising of the alternating potential above the direct current line potential.

Considering a single wave of the alternating electromotive force and assuming the line voltage to be introduced in the same circuit in a direction to oppose the flow of current due to the electromotive force, it will be clear that the direct current voltage will be superior in magnitude at the beginning of the cycle and that a considerable current will tend to flow against the alternating voltage. As the wave proceeds, however, while the direct voltage remains constant the alternating voltage increases tending to reduce the amount of current flowing and as the alternating voltage rises still more, a point will be reached (assuming the alternating wave of sufficient maximum peak) at which the two electromotive forces will be equal and current will tend to cease to flow for the moment. As, however, the wave proceeds still further, the alternating electromotive force becomes the superior and current will tend to flow in the reverse direction from the alternating to the direct current circuits. This I prevent by inserting between the direct current and alternating current systems a mercury vapor rectifier so polarized as to permit the flow of current in the desired direction only; so that when the current flowing from the direct to the alternating circuits once ceases as above pointed out the tendency for the reversal of flow will be withstood.

Passing now to the next wave of electromotive force in which the direct current potential remains unchanged but the alternating current wave is reversed in direction, I interrupt the continuity of the circuit between the systems at some period after the ceasing of current flow between the two circuits and before the return of the tendency for the current to flow again in the original direction due to the drop in the peak of the opposing alternating electromotive force. This may be accomplished by a sliding switch contact or other synchronously operating mechanism. Obviously were current permitted to be reëstablished in the useful direction toward the end of the first wave when the alternating electromotive force is falling the current flowing between the two circuits would become greater and greater until a short circuit is reached and no opportunity would be provided for its suppression.

It will be clear from what has been said that the principles involved in this invention, as far as this particular aspect is concerned, depend upon the presence of such an alternating current wave in the receiving circuit as will rise superior to the direct current line potential near the peak so that the flow of current can be automatically cut off at the critical time. It is very important, however, that there be some means for adjusting, to the demands of the receiving circuit, the actual energy delivered. For example, should a receiving circuit be supplying a large demand and the voltages of the line and the alternating machine be relatively adjusted to produce this result and should the load be suddenly removed, it is desirable that the system automatically reduce the absorption of power from the line corresponding to the amount of energy withdrawn. This may be accomplished in various ways, some of which I have illustrated in the drawings of the present application. For example, if on the withdrawal of power, the voltage of the receiving machine automatically increases it will lessen the period during which favorably directed current flows from the line and thus reduce the energy delivered to the system.

A high tension direct current transmission will require a continuous current, which changes only slowly, relatively speaking, on account of the naturally high inductances in such a circuit; but the flow of useful current from the line at the receiving end as so far provided for in the above explanation covers only intermittent current flow and thus does not satisfy the natural characteristic of the supply. In the practical application, however, I utilize a plurality of connecting points between the line and the receiving circuit in such a manner that current can flow at any instant in some one of the several branch circuits. This plan is facilitated by the use of a polyphase alternating machine at the receiving end such, for example, as a three phase machine. This will be more clearly understood by reference to the more detailed systems illustrated in the drawings and described hereinafter.

It will be seen from what has been said that the alternating machine at the receiving end acts as a sort of magnetizing or pilot machine to establish the frequency of the receiving circuit and to determine the wave form thereof and to act as a storage means for smoothing out the flow of current to the receiving circuits. The main flow of energy, however, will be from the direct current line wire to the transformers, where these are used, and out on the receiving mains directly, this energy flow receiving the necessary modification and supplementation from the alternating current machine on the way.

In the drawings.

Fig. 2$^a$ is a transverse section of cylinder A, showing the angular displacements of segments 104$^a$, 105$^a$ and 106$^a$;

Fig. 2$^b$ is a transverse section of cylinder B, showing the angular displacements of segments 107$^b$, 108$^b$ and 109$^b$;

Figures 1, 5:
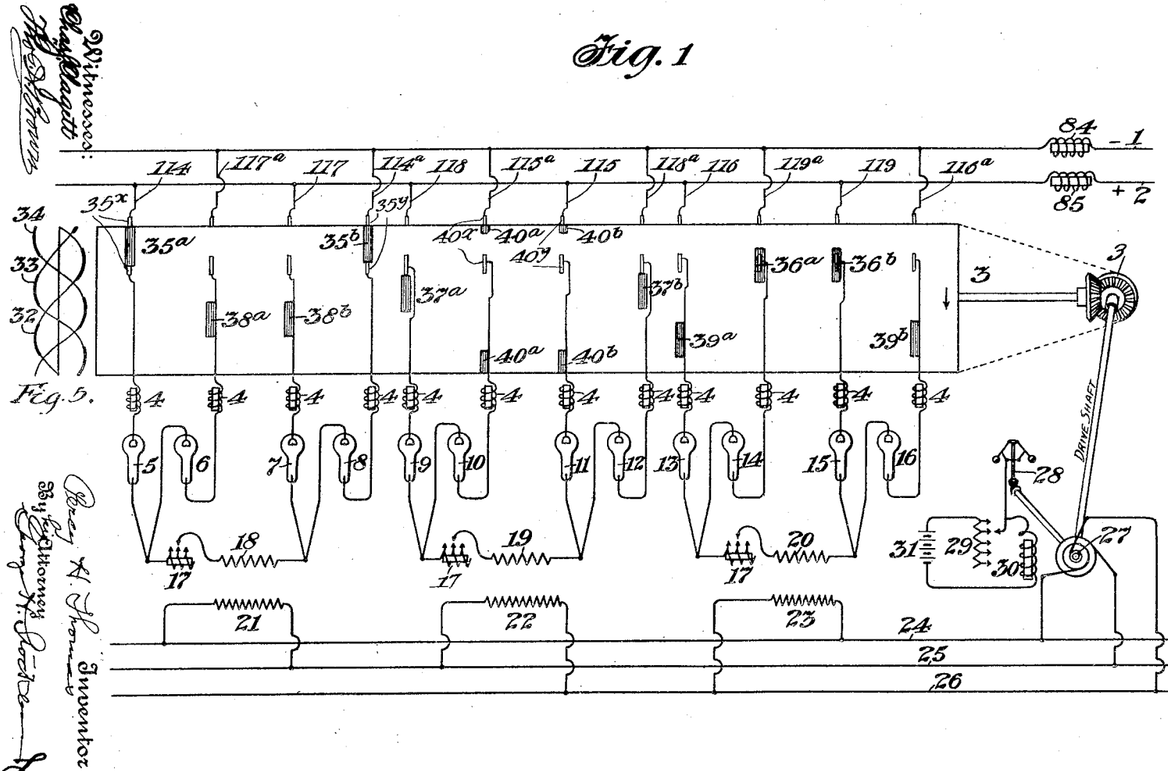
Figure 1 represents a simple embodiment of the receiving system of my invention.
Fig. 5 shows the three electromotive force waves of a three phase circuit and the portions thereof which are utilized for transfer of power.

Fig. 1 represents the circuits and apparatus at the receiving end of one embodiment of my power transmission system, 1 and 2 representing the incoming high tension direct current lines from the source, and 24, 25 and 26 representing the local feed wires. 27 represents a three phase machine connected to the three phase mains 24, 25 and 26, and 21, 22 and 23 are three delta-connected transformer secondary windings whose high tension windings are shown at 18, 19 and 20 respectively. The direct current line voltage is impressed upon the three transformers through a number of multiple paths containing the rectifiers 5, 6, 7, 8, 9, 10, 11, 12, 13, 14, 15 and 16. In passing from the line wires 1 and 2 to the several rectifiers these circuits pass through brushes 35$^x$, 35$^y$, to 40$^x$, 40$^y$, inclusive, on the surface of of a revolving cylinder, 3, provided with plates in such a manner that each circuit is closed during a portion only of a revolution of the cylinder. I have indicated the portion during which any particular circuit is closed by a shaded block on the developed surface of the cylinder, 3. As the means for securing such intermittency of contact are well known and form no part of the present invention, I have not illustrated them in detail, but have merely indicated by the shaded blocks during what period of the revolution of the cylinder, 3, any particular circuit is closed. For example, the circuit of the rectifier, 5, and the circuit of the rectifier, 8, are closed during the portion of the revolution indicated by the blocks marked $35^a$ and $35^b$. Similarly the circuits of the rectifiers 14 and 15 are closed during a portion of the cycle corresponding to shaded blocks $36^a$ and $36^b$ respectively and so on with the other circuits.

I have called the element 27 in Fig. 1 a synchronous machine meaning by this a machine which is always connected to the alternating current distribution mains and which in virtue of its momentum is at all times ready to supply for short periods alternating current and voltage of the normal generator type. Of course in this system the momentum of the machine is replenished by every current impulse from the direct current supply. In this sense, of course, during the continuance of the supply impulse the machine acts as a motor as well as acts as a generator. However, even during this period, the machine must support the flow of energy in one or more of the phases since the motor effect due to a passing supply impulse is not simultaneous in all the windings of the machine.

In actual operation it is understood that the cylinder, 3, rotates in synchronism with the machine, 27, as may be brought about, for example, by a direct and rigid drive between the machine and the cylinder. The cylinder may, however, be driven by a synchronous motor or otherwise to secure synchronism. As illustrated the cylinder, 3, is making one revolution for each complete period of the alternating supply, though, if desired, any number of complete cycles might correspond to a revolution of the cylinder. For convenience I have illustrated in Fig. 5 one cycle of the three phase supply at the left of the development of the surface of the cylinder, 3; 32, 33 and 34 representing the three electromotive forces of the transformers 20, 19 and 18, respectively.

An examination of the relative location of the several shaded blocks $35^a$, $35^b$ to $40^a$, $40^b$ inclusive makes it clear that one pair of circuits carries the whole current for a certain period; that then for a brief period another pair of circuits operates in parallel with the first; that the first circuit is then interrupted permitting the second to operate for a definite period; that the third circuit is then put in parallel to the second for a brief period and is later in turn left as the sole operating circuit. After another parallel period the fifth circuit appears and so on until the sixth circuit is finally replaced by the first circuit and so on cyclically. In other words, the six double circuits take turns carrying the direct current from the line and there are brief transition periods during which current is leaving one pair of circuits and becoming established in another during which periods two pairs of circuits are in parallel.

By an examination of the relation of the shaded blocks to the electro-motive-forces of the transformers and remembering that the electromotive force, 32, Fig. 5, is the electromotive force of the transformer, 20; 33 the electromotive force of the transformer, 19; and 34 of the transformer 18, it is clear that the connection is completed in one pair of circuits, 114, $114^a$, for example, during the time that the electromotive force of the transformer winding 18 due to machine 27 connected with these circuits is at or near its maximum and further that when this maximum transformer electromotive force from machine 27 is in the one direction, the impulse of current from the positive main 2 is made to pass through the rectifier 5 and transformer primary 18 in one direction and when the maximum electro-motive-force is in the other direction the impulse of the current from the positive main 2 passes through the transformer primary 18 but through another set of rectifiers, 7 and 6, and in the opposite direction. More in detail the circuits may be traced as follows: With the apparatus in the position shown in Fig. 1 there is a current flow from the positive main over the brush $35^x$ and the segment $35^a$ over the inductance 4, the rectifier 5, the inductance 17, the transformer primary 18, the rectifier 8, the inductance 4, the segment $35^b$ to the negative main. The cylinder 3 is so timed that, when the segments $35^a$ and $35^b$ are under the brushes $35^x$ and $35^y$, the counter electro-motive force of the synchronous machine produces a voltage in such a direction in the primary 18 as to be opposed in direction to the impulse from the positive main whose path was just traced, with the result that this impulse, which is of superior voltage, imparts energy to the synchronous machine 27 through the transformer windings 18, 21. At this particular instant no other segments are in such a position as to connect any pair of brushes. However, directly after the moment just considered the segments $40^a$ and $40^b$ are connected to the corresponding brushes and current will flow from the positive main 2 over the segment $40^b$, the inductance 4, the rectifier 11, the transformer primary 19, the inductance 17, the rectifier 10, the inductance 4, the segment 40ª back to the negative main. At this time the counter electromotive force of the synchronous machine is such as to produce an electromotive force in the primary 19 opposed to the direction of flow of the last described impulse from the positive main and energy is again imparted to the synchronous machine 27. At a slightly later time the segments 39ª and 39ᵇ will come under their respective brushes and a circuit will be established from the positive mains through the rectifiers 13 and 16 and the transformer primary 20 as before and so on through the six circuits which cross the drum 3. In each case the impulse from the direct current source imparts a certain quantity of energy to the synchronous machine 27, these several disconnected energy portions being transmitted through the transformers in turn. As already explained the momentum of the synchronous machine 27 is sufficient to integrate the supply impulse and to support a substantially uniform rotation which maintains the normal alternating wave of voltage on the alternating current mains. In this it may be noted that the current impulses passing from the positive mains pass over the cylinder, through the rectifier to a transformer primary and back through an oppositely connected rectifier across the cylinder to the negative main. It will also be noted that when the circuit 115, 115ª comes in parallel with the previously operating circuit 114, 114ª, that the alternating current electromotive force on the new circuit 115, 115ª is less than that upon the old circuit 114, 114ª, and since the alternating electromotive force is a counter electromotive force, the current will flow more readily from the direct current line 2 in the circuit containing the lesser alternating current electromotive force, that is, the newly formed circuit 115, 115ª. Furthermore this will be to the exclusion of all current from the older circuit 114, 114ª with the greater counter alternating current electromotive force, since the division of current between the circuits is determined not by the relative resistance of the circuits but by the comparative counter electro-motive forces in the receiving circuits. In other words, when the new circuit 115, 115ª is closed, the old circuit 114, 114ª is robbed completely of its current flow. When, however, the current has become established in the newly formed circuit 115, 115ª, the counter electromotive force of the alternating current rises, thus tending to reduce the actual flow of current, until the counter electromotive force approaches in value approximating the direct current supply. At or about this time a third circuit 116, 116ª is closed in parallel with the second circuit 115, 115ª, the first circuit 114, 114ª having already been opened. This third circuit 116, 116ª has for the moment a less alternating current counter electromotive force than the second circuit 115, 115ª. Current will then, in accordance with the above principle, be transferred from the second circuit 115, 115ª to the third circuit 116, 116ª and this circuit, in turn, will be subjected to a rising counter electro-motive-force and the action goes on, each circuit turning over the current flow to another circuit having, for the instant, a lower counter electromotive force but later subjected to a rise of counter electromotive force in its turn in accordance with the normal progression of the system. The result then follows that the direct current voltage and current from the line, 2 are continuous in one circuit or another and always flow against the counter electromotive force of the alternating current of the synchronous machine, 27, and thus deliver power to that machine and that the substitution of one circuit for another is automatically made as the occasion requires.

It is understood that the rectifiers 5, 6, 7, 8, 9, 10, 11, 12, 13, 14, 15, and 16 permit the passage of current in but one direction only, namely the direction toward the transformer primaries in the case of the odd numbered rectifiers and away from the transformer primaries in the case of the even numbered rectifiers, as shown in Fig. 1. These rectifiers are here illustrated as mercury vapor rectifiers, though I do not wish to limit myself to this particular form of rectifier, for other forms having the same property will serve equally well. I have also found these rectifiers to be especially suitable for high voltage work. The polarity of the rectifiers shown will be maintained, if desired, by constituting the lower electrode a cathode and maintaining this electrode excited by any of the well known methods.

In order to resist any tendency for too rapid a change of potential in passing from one circuit to another and to maintain a relatively constant flow of current in the supply circuit I introduce reactances at various points, as shown in Fig. 1. The reactances 84 and 85 are very effectively placed for maintaining uniform current in the main line wire, while the reactances, 4, more particularly affect the rate of exchange of current from one branch circuit to another. This affects the wave form of the current in the transformer primaries. The adjustable inductances, 17, in series with these primaries further serve to control the wave form and steady the current flow. These various inductances can be mutually adjusted to produce almost any desired rate of interchange of current flow between circuits and control of wave form in the transformer circuits. They also serve to prolong the period of current flow in any particular circuit for the transmission of a given amount of energy, considered with reference to a given cycle which works for better efficiency. These reactances also serve to control excessive rushes of current on the closing of new circuits with relatively low counter electromotive forces.

Having thus explained the interchange of power and current between the alternating current mains and the direct current line, I will describe the means used for establishing the frequency of the receiving circuit and for rendering automatic the adjustment of the flow of energy to the requirements of the circuit. 28 is a centrifugal governor driven from the synchronous machine, 27, but controlling the field winding, 30, of the synchronous machine through the adjustment of the resistance, 29, introduced between the supply battery, 31, and the generator field, 30. If the speed of the synchronous machine exceeds a predetermined value, the governor cuts out resistance from the field circuit and strengthens the field magnetism which raises the voltage of the synchronous machine, 27, and thus cuts down the supply of current through the increasing of the counter electromotive force. This operation both controls the speed of the synchronous machine, 27, and then the frequency of the circuit and automatically limits the flow of energy into the receiving system to the load requirements.

Figure 2:
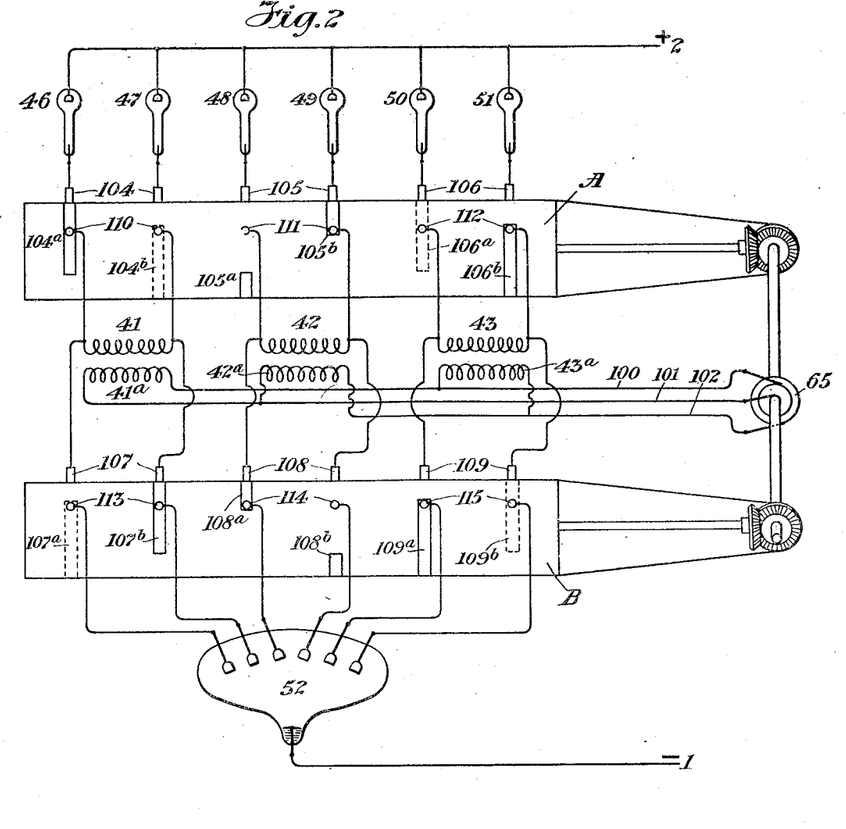
Fig. 2 shows a modification of the arrangement of rectifiers and synchronous cylinders.
Figure 2A:
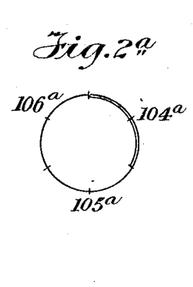
Figure 2B:
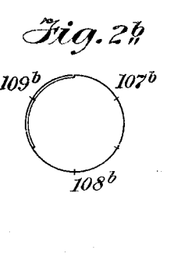

Fig. 2 shows a modification of Fig. 1 in which the circuits connecting the transformer windings with the direct current line are divided into two groups, those connecting the positive main with the transformer windings forming one group and those connecting the transformer windings to the negative main representing a second group. In Fig. 2 the transformer primaries are shown at 41, 42 and 43, the secondaries being shown at 41$^a$, 42$^a$ and 43$^a$, respectively. The transformer secondaries 41$^a$, 42$^a$ and 43$^a$ are connected to the three alternating current mains 100, 101 and 102 and the machine marked 65 which is similarly connected and has a function similar to what is shown in Fig. 1 for the machine 27. The first group of circuits contain single phase rectifiers, having anodes connected to the positive direct current line wire as shown at 46, 47, 48, 49, 50 and 51. The second group of circuits traverse a poly-phase rectifier 52, having six anodes and a single cathode. I provide two cylinders, each carrying a contact apparatus appropriate to one of the two groups of circuits, these two cylinders being shown at A and B. As the operation of the apparatus in Fig. 2 is substantially the same as that of Fig. 1, except for the changes shown, no repetition of the description thereof is required. It will be noted that the rectifier, 52, is simpler and more compact and serves the same purpose as six rectifiers having their cathodes connected to the negative transmission line.

In the operation of the system of Fig. 2 current flows at a certain time from the positive main 2 to the rectifier 46, the left hand brush 104, the segment 104$^a$, the left hand brush 110, the transformer primary 41, the right hand brush 107, the segment 107$^b$, the right hand brush 113, the rectifier 52 to the negative main. This generates an impulse in the transformer secondary 41$^a$ which is timed by the cylinder A and B to impart energy to the machine 65 as explained in Fig. 1 for machine 27. At a certain later period energy flows from the supply main 2 to the rectifier 48 to the left hand brush 105, the segment 105$^a$, the left hand brush 111, the primary 42, the right hand brush 108, the segment 108$^b$, the right hand brush 114 to the rectifier 52 and the main 1, similarly for a subsequent current impulse for the transformer primary 43. A half cycle after the impulse through the transformer primary 43 currents enter the transformer 41 from the main 2 by way of the rectifier 47, the right hand brush 104, the contact plate 104$^b$, the right hand brush 110, the transformer secondary 41 and continues through the left hand brush 107, the contact plate 107$^a$, the left hand brush 113, the rectifier 52 and the main 1. Similarly for reverse impulses in the other transformer primaries. Thus in one complete cycle there occur six impulses of current from the supply passing through three transformers, two to a transformer, the two impulses of the pair being oppositely directed. These impulses are obviously all timed in synchronism with the similar impulses of the alternating voltage maintained by the machine 65 in virtue of its continuous rotation.

In Figs. 2$^a$ and 2$^b$ are shown the extent of the circumference covered by the several left hand contact plates on the surface of the cylinder A Fig. 2 and the right hand contact plates on the surface of the cylinder B Fig. 2. These contact plates may slightly overlap to give a continuous flow of current as already explained for Fig. 1. The left hand contact plates 104$^a$, 105$^a$ and 106$^a$ of the cylinder A and the right hand contact plates 107$^b$, 108$^b$ and 109$^b$ of the cylinder B are placed 180 degrees around the cylinder from the like numbered contact plates.

Figure 3:
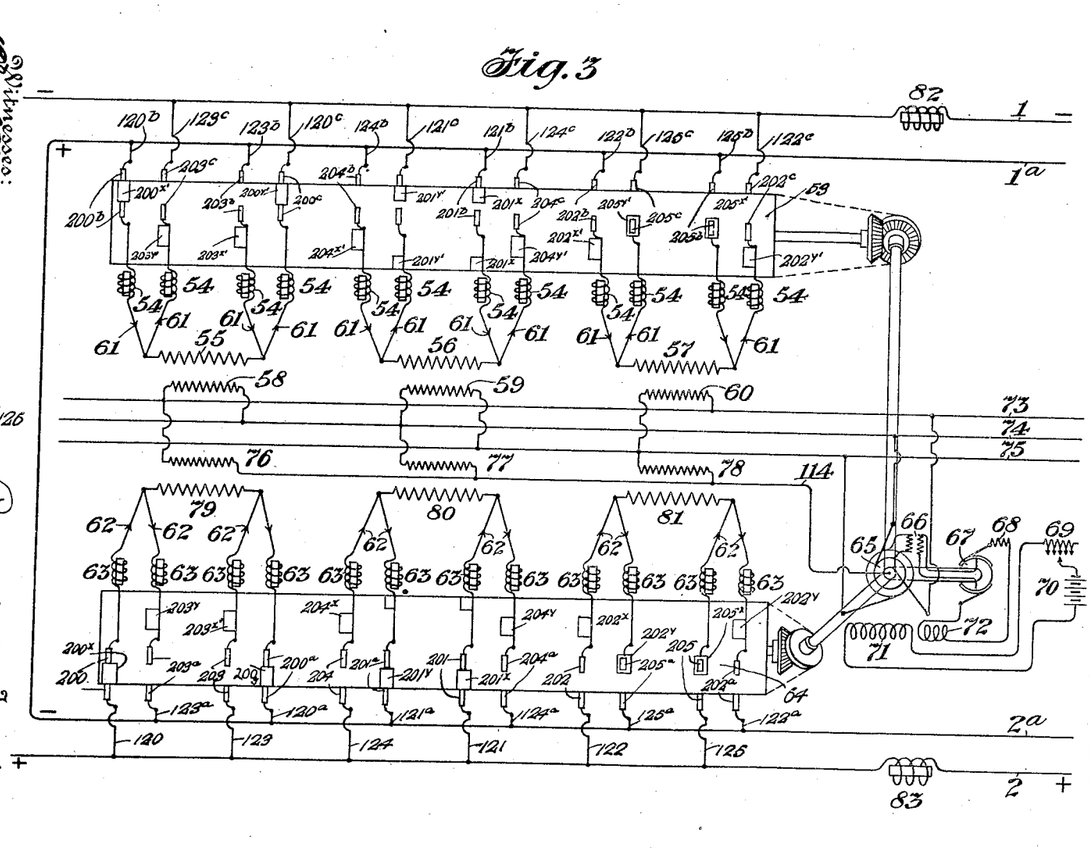
Fig. 3 shows a somewhat more complex but more efficient and effective system for certain requirements.

Fig. 3 is a modification of Fig. 1 in which two groups of transformer primaries and two groups of rectifiers and two switching cylinders are utilized. In this figure 1 and 2 are the direct current supply mains and 73, 74 and 75 are the receiving and distributing alternating current mains corresponding to the mains 24, 25 and 26 of Fig. 1. The conductor, $1^a$, acts as a positive direct main for the upper rectifying set $120^b$ to $125^c$, inclusive, and the conductor $2^a$ acts as an operating negative direct current main for the lower set 120 to 125, inclusive, of rectifying rectifiers, these two conductors being connected as shown at 126 at the left of the figure. 65 is a three phase alternating current machine connected to the mains 73, 74 and 75 and having a neutral point of the winding brought out and connected to the supplementary main, 114. Three transformer secondaries, 58, 59 and 60 are connected in delta across the three phase mains, 73, 74 and 75, and their high tension windings are shown at 55, 56 and 57. These high tension windings are connected through six leads $120^b$, $121^b$, $122^b$, $123^b$, $124^b$ and $125^b$, and six leads $120^c$, $121^c$, $122^c$, $123^c$, $124^c$ and $125^c$, with the main 1 and $1^a$ through a cylinder, 53, and the group of rectifiers, 61, as in the system of Fig. 1. I have here illustrated the rectifiers merely by an arrow indicating the direction in which current is permitted to flow through the rectifiers and I have merely shown the outline of the cylinder, 53, since this is similar to the cylinder of Fig. 1. The operation of the transformer secondaries 55, 56 and 57 and the other parts of this portion of the system may be understood from what has already been said and no further description is here necessary. In addition to the transformer secondaries, 58, 59 and 60, I have also the transformer secondaries 76, 77 and 78 connected in star, each to one or another of the mains, 73, 74 and 75 and all to the neutral bus bar, 114. These transformer secondaries excite the corresponding windings, 79, 80 and 81. These windings are connected to the direct current mains 2 and $2^a$ through a switch cylinder, 64, as in the upper part of Fig. 3. The rectifiers, 62, are introduced as above, and the operation of the lower portion of the system will be understood to be similar to that of the upper.

Taking the system as a whole, direct current of the supply enters at the main, 2, and traverses the various circuits connected with the cylinder, 64, and the rectifiers, 62, and returns through the transformers 79, 80 and 81 to the main $2^a$ and traverses this to the main $1^a$, and from there through the cylinder, 53, the rectifiers, 61, the transformer primaries 55, 56 and 57 to the outgoing main 1. It will be noted that the two parts of this system are, so to speak, in series and further, in view of the 30 degree phase relation between the electromotive forces of the transformer primaries, 55, 56 and 57 with the transformer primaries 79, 80 and 81 a very steady resultant electromotive force will be produced to balance the line direct current electromotive force. The change over from one branch circuit to another in the upper group of rectifiers occurs at a time intermediate between the change over periods of the lower group of rectifiers.

I excite the machine, 65, with its field winding, 71, from the battery, 70, through the adjustable resistance, 69. I also supply a supplemental field winding, 72, through the resistance, 68, by means of a commutator, 67, on the shaft of the machine, 65. This commutator, 67, is fed from the transformer, 66, which is fed from the windings of the machine, 65. Should, now, the voltage rise too high in the machine, 65, the voltage on the field would be raised by the supplemental field winding, 72, and the supply of energy to the system cut down. This tends to maintain the voltage of the machine constant and thus with a constant setting of the resistance, 69, to maintain the speed of the machine and the efficiency constant. The regulating arrangement of Fig. 1 may also, if desired, be used in any of the applications of my invention where appropriate.

The inductances 82 and 83 and the inductances 54 and the inductances 63 serve the purposes of the corresponding inductances in Fig. 1. Furthermore, if desired, inductances can be used in series with the transformer primaries; 55, 56, 57, 79, 80 and 81. These inductances serve the function already explained in connection with the earlier figures.

The operation of the system of Fig. 3 in detail is as follows: Direct current of the supply enters at the main 2 and traverses the circuit 120, the elements 200, $200^x$, 63, 62, 79, 62, 63, $200^a$, $200^y$, $120^a$ to the main $2^a$ and traverses this to the main $1^a$, the circuit $120^b$, the elements $200^b$, $200^{x'}$, 61, 55, 61, $200^c$, $200^{y'}$, the lead $120^c$ to the outgoing main 1. Current next flows from the main 2 through the circuit 121, the elements 201, $201^x$, 63, 62, 80, 62, 63, $201^a$, $201^y$, the lead $121^a$ to the main $2^a$, thence to the main $1^a$, the circuit $121^b$, the elements $201^b$, $201^{x'}$, 54, 61, 56, 61, 54, $201^c$, $201^{y'}$, the lead $121^c$ to the outgoing main 1. The following impulse from the main 2 enters the circuit 122, the elements 202, $202^x$, 63, 62, 81, 62, 63, $202^a$, $202^y$, the lead $122^a$ to the negative main $2^a$, thence to the positive main $1^a$, the lead $122^b$, the elements $202^b$, $202^{x'}$, 54, 61, 57, 61, 54, $202^c$, $202^{y'}$, the lead $122^c$ to the outgoing main 1. The next set of connections then comes into play and current flows from the main 2 by way of the lead 123, the elements 203, $203^x$, 63, 62, 79, 62, 63, $203^a$, $203^y$, the lead $123^a$ to the negative main $2^a$ and the positive main $1^a$ to the lead $123^b$, the elements $203^b$, $203^{x'}$, 54, 61, 55, 54, $203^c$, $203^y$, the lead 123 to the outgoing main 1. Current next flows from the main 2 by way of the lead 124, the elements 204, 204$^x$, 63, 62, 80, 62, 63, 204$^a$, 204$^y$, the lead 124$^a$, the negative main 2$^a$, the positive main 1$^a$, the circuit 124$^b$, the elements 204$^b$, 204$^{x\prime}$, 54, 61, 56, 61, 54, 204$^c$, 204$^{y\prime}$, the lead 124$^c$ to the outgoing main 1. Current next passes from the main 2 to the lead 125, the elements 205, 205$^x$, 63, 62, 81, 62, 63, 205$^a$, 205$^y$, the lead 125$^a$, the negative main 2$^a$, the positive main 1$^a$ to the circuit 125$^b$, the elements 205$^b$, 205$^{x\prime}$, 54, 61, 57, 61, 54, 205$^c$, 205$^{y\prime}$ and the lead 125$^c$ to the outgoing main 1. The cyclical operation of all the sets of circuits will be clearly understood from what has already been said in connection with the other figures.

Figure 4:
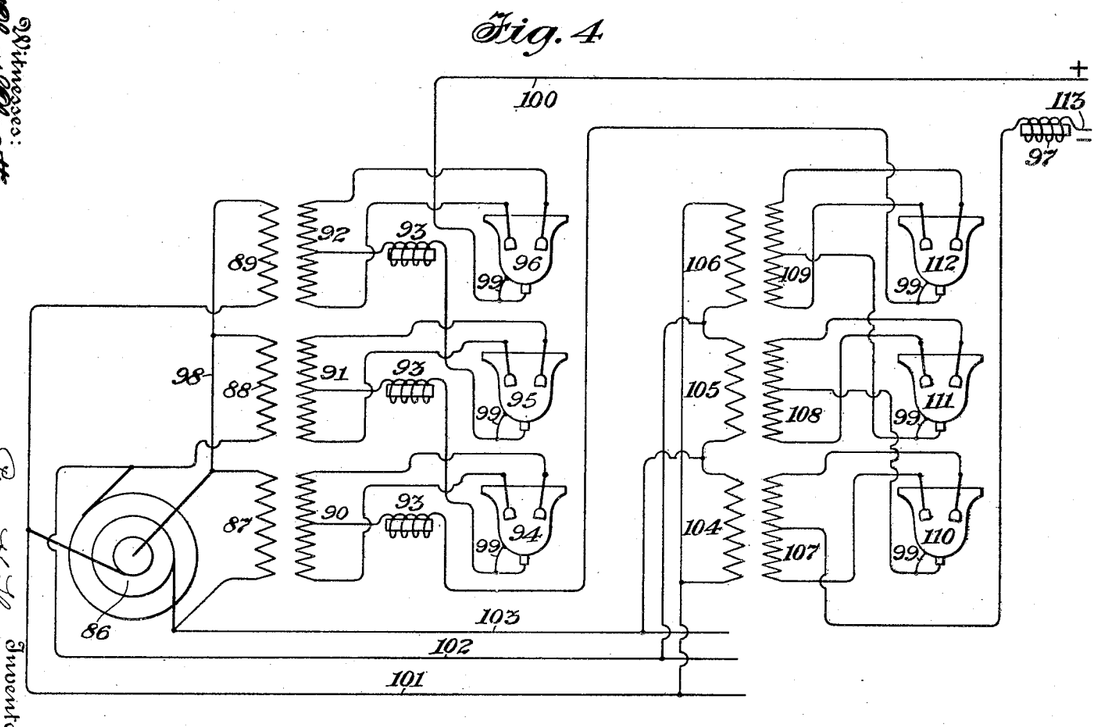
Fig. 4 shows a generating system for producing high voltage direct current for the transmission line.

In Fig. 4, I show a system of circuits suitable for producing a high voltage direct current for supplying such receiving systems as have been shown in connection with the other figures of the drawings. At 86 I show a three phase machine supplying three phase mains, 101, 102 and 103, and having a neutral point of the winding connected to a neutral main, 98. Two sets of transformer primaries, 87, 88 and 89, and 104, 105 and 106 are fed from this generator, the former three connected in star and the latter in delta. The transformer secondaries, 90, 91 and 92, and 107, 108 and 109 are supplied respectively from these primaries. These secondaries feed the rectifiers, 94, 95 and 96, and 110, 111 and 112, here illustrated as mercury vapor rectifiers of the usual type, the extremities of the windings being connected to two anodes and the middle points of the windings being connected, some through reactances each to the cathode of a neighboring rectifier, the connection in the case of the transformer secondary, 107, being through the transmission line and the receiving circuits back to the cathode of the rectifier, 96. I have shown these rectifiers as having metal cases and connect these cases to the cathode through the conductors, 99. This serves to maintain the potential of the cases definite with respect to the portion of the circuit to which they are directly operated. If it is desirable this result may be attained by connecting the case to any of the other leads or to points in one of the windings with which the rectifier is directly connected. The inductance, 97, serves to steady the flow of current. Coils similar to 93 might be used wherever desired to steady current flow in the leads of the cathodes of the rectifiers 110, 111 and 112. The fact that transformers delta connected have a phase difference of thirty degrees from transformers star connected to the same mains gives a very uniform and constant electromotive force in the line wire for this is the summation of the six electromotive forces corresponding to the six transformers.

I have now described one embodiment or one application of my invention, but I wish it understood that I do not consider it to be limited to this specific apparatus or method of operation for the principles I have used are of very broad application, and any use of them in connection with other apparatus than that shown, either in whole or in part, comes within the scope of the present application. For example, although I have shown three phase systems, four phase or any other number of phases might be used provided the arrangements are such as to meet the essential conditions upon which the operation depends. Any form of rectifier which will suppress the flow of current in a predetermined direction can be substituted for the mercury vapor rectifier shown, and any other means for providing for the opening and re-connecting of the various circuits connecting the direct and alternating current systems of the receiving end may be substituted for the switch cylinders. Furthermore condensers, reactances and resistances may be used in various ways to modify the form or flow of current to meet the particular requirements of any set of apparatus. In fact the transformers shown in the various figures may be omitted and the rectifier circuits connected directly to alternating current mains if the voltages are suitable. I may further recommend for certain classes of work the use of what might be called single phase rectifiers in connection with the generator apparatus of Fig. 4, that is rectifiers having one main anode and one main cathode in each container with separate containers for each terminal of the supply. Again three phase transformers or three phase groups of transformers may be used in place of the single phase transformers and three phase rectifiers fed from three phase transformer secondaries may be then connected in series according to the system shown in Fig. 4.

I claim as my invention:

1. A system of electrical distribution comprising a direct current transmission line, a receiving system containing a source of alternating current, and vapor rectifiers interposed between said transmission line and said receiving system, in combination with means for completing the circuits of said rectifiers, for passing with regard to the direction of voltage in said alternating receiving system timed impulses to said receiving system, and for interrupting the circuit of said rectifiers at other times, energy being thus supplied to said receiving parts in separate integral sections.

2. In a system of electrical distribution, a direct current supply source, a receiving circuit containing a source of alternating current, and means for controlling the direction of current between said direct current source and said receiving circuit, in combination with means for controlling the time of current impulses from said supply to said receiving circuit.

3. In a system of electrical distribution a direct current supply circuit, a receiving circuit, an alternating current machine in said receiving circuit maintaining a definite frequency and rectifiers interposed between said direct current circuit and said machine in combination with circuit making and circuit breaking devices whereby energy is delivered from said supply circuit to said alternating circuit.

4. In a system of electrical distribution, a constant direct current supply and an alternating receiving circuit, in combination with means for connecting the supply circuit to the alternating current circuit at a given point at times when the direct current and alternating electromotive forces are opposed, means for suppressing the flow of current from the receiving circuit to the source during such periods, and means for severing the said connection between the systems at periods when the direct voltage and the alternating voltage are in the same direction.

5. In a system of electrical distribution, the combination with a direct current source, a three phase alternating receiving circuit, three single phase transformers serving to raise the voltage in said receiving circuit and means for permitting the flow of current from the direct current supply against electromotive force in any of said transformers during periods of rising alternating voltage only in said transformer, of means for suppressing current flow in response to alternating voltage in said transformers operating in the same direction as in the direct source.

6. In a system of electrical distribution, the combination with a direct current supply line, an alternating receiving circuit, an alternating electromotive force machine in said circuit, means for permitting the voltage of the supply line to overcome the alternating voltage, thus causing the said alternating voltage to supply energy to said alternating system and means for raising said alternating voltage in response to an over supply of energy, whereby automatic adaptation of the supply of energy to the demands of the receiving circuit is obtained.

7. The combination with a direct current source, a dynamo electric machine capable of establishing an alternating electromotive force, means for electrically impressing voltage from said direct current source upon said dynamo electric machine whereby energy is supplied thereto and means for determining the frequency established by said dynamo electric machine.

8. The combination with a direct current source, a dynamo electric machine capable of establishing an alternating electromotive force, means for electrically impressing voltage from said direct current source upon said dynamo electric machine whereby energy is supplied thereto and means for determining the frequency established by said dynamo electric machine, said means including a centrifugal governor controlling the magnitude of the voltage of said dynamo electric machine.

9. In a system of electrical distribution, the combination with a direct current supply circuit, a receiving circuit, means for electrically passing impulses of current from said supply circuit in alternating directions upon said receiving circuit and means operated from said alternating impulses for establishing therefrom a definite alternating potential wave in said receiving circuit.

10. In a system of electrical distribution, a direct current supply circuit and three phase receiving circuit, three single phase transformers connected to the several phases of said three phase receiving circuit, a connection from each terminal of each transformer primary to both mains of the direct current supply, a mercury vapor rectifier interposed in each connection from the positive supply main, to a transformer terminal, permitting a flow of current only toward the transformer winding, a mercury vapor rectifier inserted in each connection between the negative supply wire and each transformer terminal, permitting a flow of current only in the direction from said transformer windings, circuit making and interrupting devices synchronously operated introduced between said supply mains and said rectifiers whereby a circuit is established between each transformer primary and the supply mains during periods of rising voltage in said primary, said connection being made in such a direction that the electromotive force of the supply and the momentary electromotive force of the transformer primary are opposed and means for maintaining the integrity of one set of connections until after the establishment of the next set of connections.

11. In a system of electrical distribution, a direct current supply circuit and three phase receiving circuit, three single phase transformers connected to the several phases of said three phase receiving circuit, a connection from each terminal of each transformer primary to both mains of the direct current supply, a mercury vapor rectifier interposed in each connection from the positive supply main to a transformer terminal, permitting a flow of current only toward the transformer winding, a mercury vapor rectifier inserted in each connection between the negative supply wire and each transformer terminal, permitting a flow of current only in the direction from said transformer winding, circuit making and interrupting devices synchronously operated introduced between said supply mains and said rectifiers whereby a circuit is established between each transformer primary and the supply mains during rising voltage in said primary, said connection being made in such a direction that the electromotive force of the supply and the momentary electromotive force of the transformer winding are opposed and means for maintaining the integrity of one set of connections until after the establishment of the next set of connections, in combination with reactance coils in the several branch circuits containing said rectifiers.

12. In a system of electrical distribution, a direct current supply circuit and three phase receiving circuit, three single phase transformers connected to the several phases of said three phase receiving circuit, a connection from each terminal of each transformer primary to both mains of the direct current supply, a mercury vapor rectifier interposed in each connection from the positive supply main to a transformer terminal, permitting a flow of current only toward the transformer winding, a mercury vapor rectifier inserted in each connection between the negative supply wire and each transformer terminal, permitting a flow of current only in the direction from said transformer winding, circuit making and interrupting devices synchronously operated introduced between said supply mains and said rectifiers whereby a circuit is established between each transformer primary and the supply mains during rising voltage in said primary, said connection being made in such a direction that the electromotive force of the supply and the momentary electromotive force of the transformer winding are opposed and means for maintaining the integrity of one set of connections, in combination with reactance coils in the several branch circuits containing said rectifiers and an inductance and a reactance in series with each transformer primary winding.

13. In a system of electrical distribution, the combination with a direct current supply system and three transformer windings, means for exciting said windings from a three phase alternating receiving system, a connection from the positive main of said supply circuit to each terminal of each transformer winding through a rectifier permitting the flow of current only in the direction toward the transformer winding, a rectifier provided with six anodes and a cathode, connections from said anodes to the terminals of said transformer windings and a connection from said cathode to the negative main of said supply circuit, a current switching device synchronously operated interposed between said transformer winding and said first named rectifier and a second synchronously operated switching device connected between said transformer windings and said last named rectifier, whereby a circuit is completed through each transformer only during periods of rising voltage in the said transformer in a direction opposed to the voltage of said supply system.

14. In a system of electrical distribution, a direct current supply system, a three phase alternating receiving circuit, a dynamo electric machine connected to the said circuit, three transformers connected in delta through rectifying devices to said supply system, three transformers connected in star to said receiving circuit and a second group of rectifiers, and circuit making and breaking devices whereby current from said direct current source is opposed through said first named group of transformers in a direction opposite to the alternating electromotive force of said transformers and afterward through said second group of transformers in a direction opposed to the electromotive forces in said second group of transformers.

Signed at New York, in the county of New York and State of New York, this 28th day of March, A. D. 1913.

PERCY H. THOMAS.

Witnesses:
HAROLD B. WOODWARD,
THOS. H. BROWN.